United States Patent [19]

Mitchell

[11] 4,177,471

[45] Dec. 4, 1979

[54] CARRIAGE AND RACEWAY MECHANISM FOR AN INK JET PRINTER

[75] Inventor: Charles S. Mitchell, Palo Alto, Calif.

[73] Assignee: Silonics, Inc., Sunnyvale, Calif.

[21] Appl. No.: 848,615

[22] Filed: Nov. 4, 1977

[51] Int. Cl.² .................. G01D 15/18; B41J 3/04; B41J 19/00
[52] U.S. Cl. ................... 346/140 R; 346/75; 400/126; 400/320
[58] Field of Search ............ 346/75, 140 R; 400/120, 400/124, 126, 320

[56] References Cited

U.S. PATENT DOCUMENTS

| 3,787,884 | 1/1974 | Demer | 346/75 |
| 4,044,881 | 8/1977 | Chai et al. | 400/320 X |

FOREIGN PATENT DOCUMENTS 1147839  4/1969  United Kingdom ................. 400/320

Primary Examiner—George H. Miller, Jr.
Attorney, Agent, or Firm—Limbach, Limbach & Sutton

[57] ABSTRACT

A carriage and raceway mechanism for an ink jet printer upon which carriage is mounted an ink jet print head for driving the ink jet print head back and forth along the raceway to allow the ink jet print head to eject droplets on a recording medium. The raceway and various other functions are designed and combined into the main frame of the mechanism for simplified construction of the mechanism and lower manufacturing costs. Means for locking the carriage against movement and means for capping and purging the ink jet print head are also provided.

9 Claims, 15 Drawing Figures

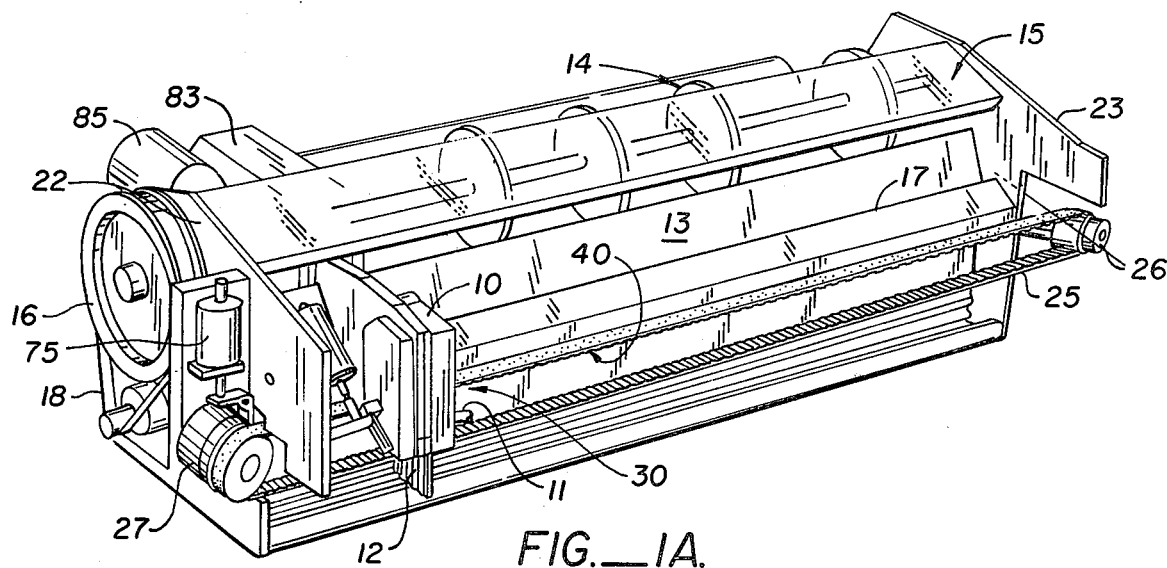
FIG.__1A.
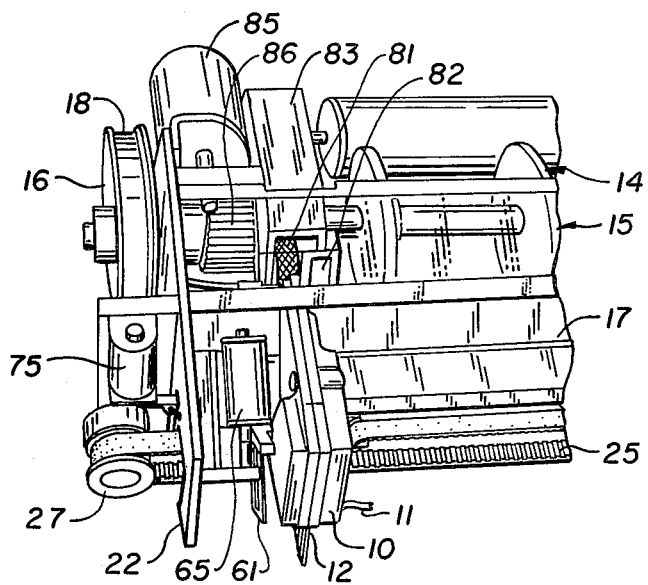
FIG.__1B.

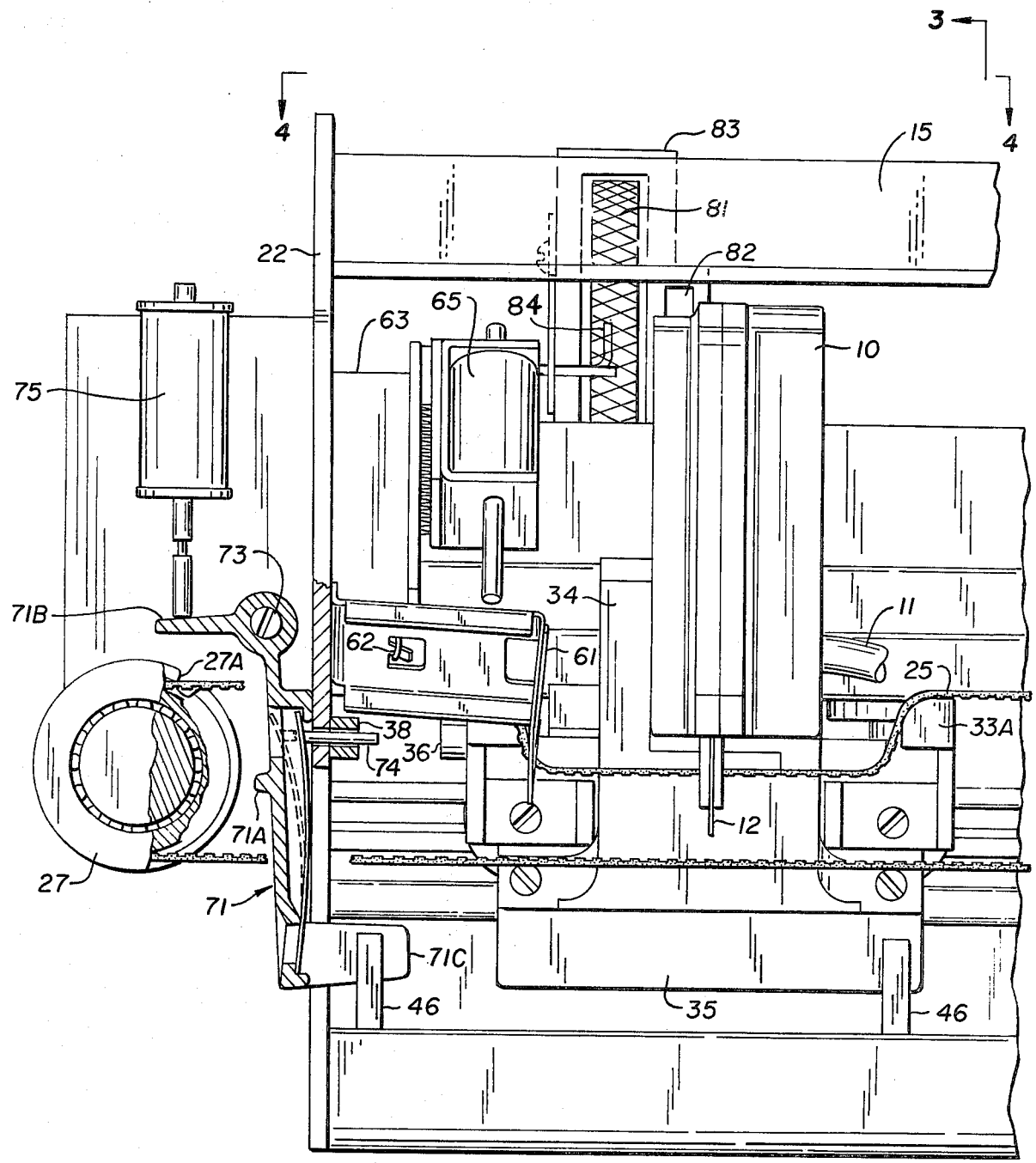
FIG._2.

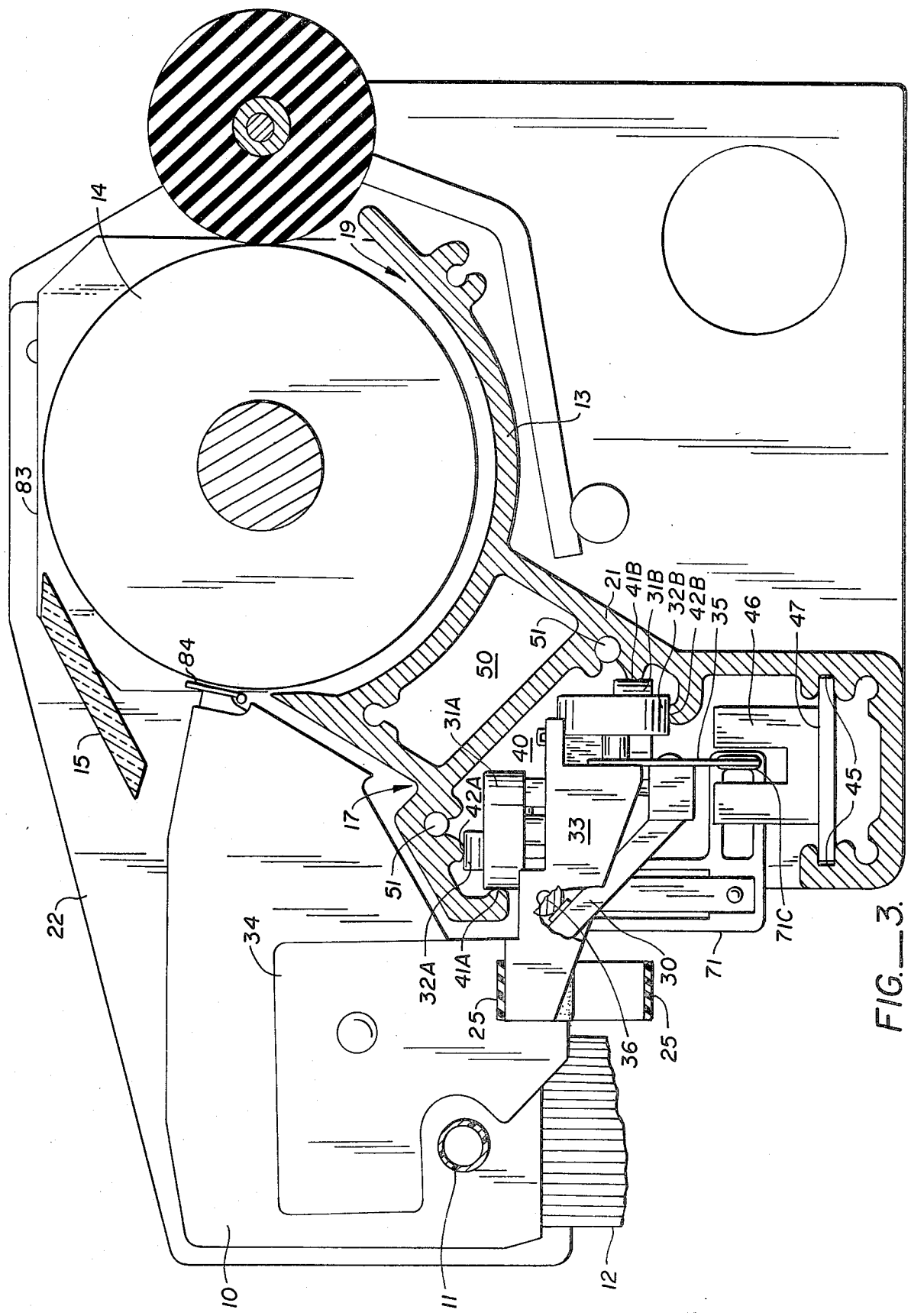

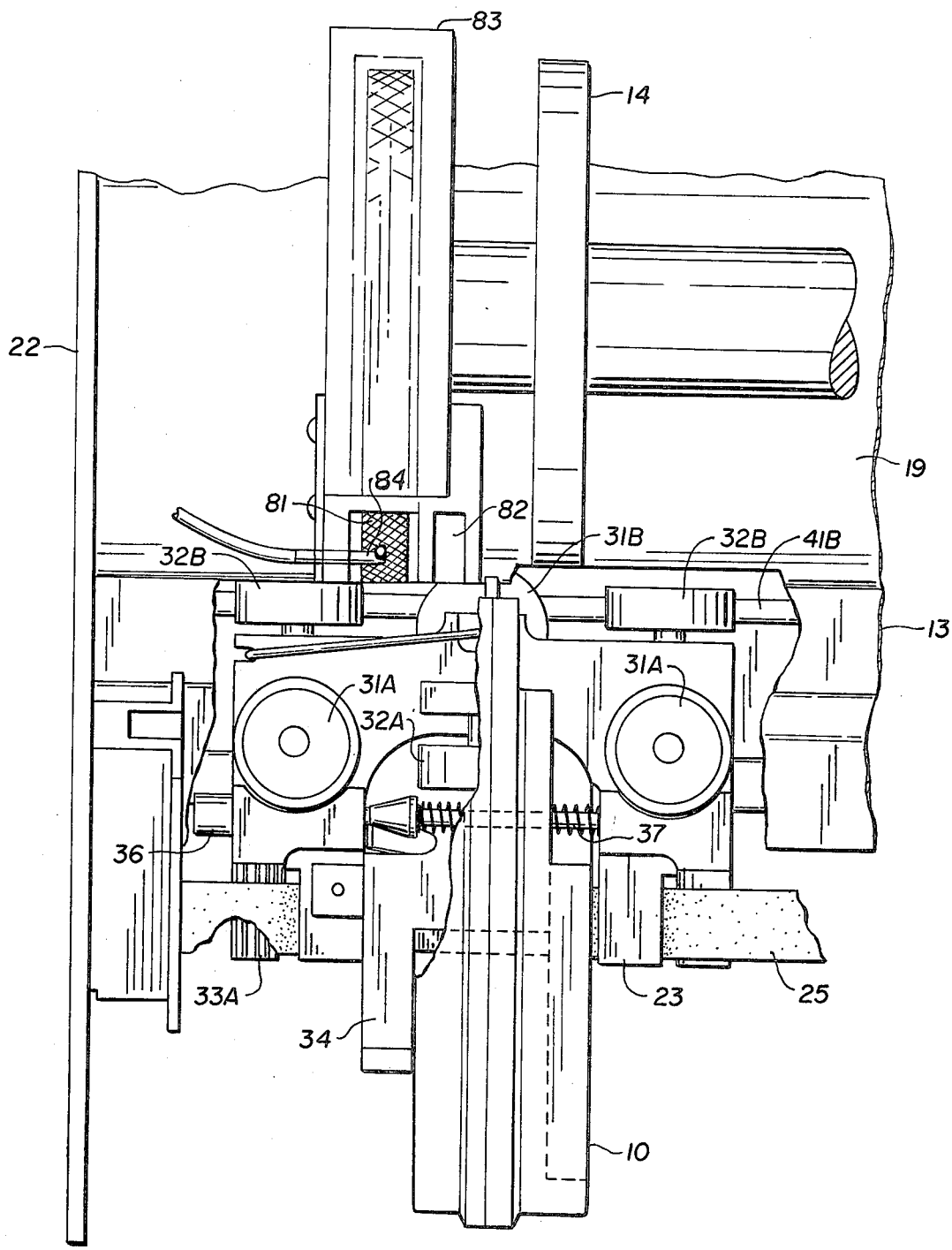
FIG._4.

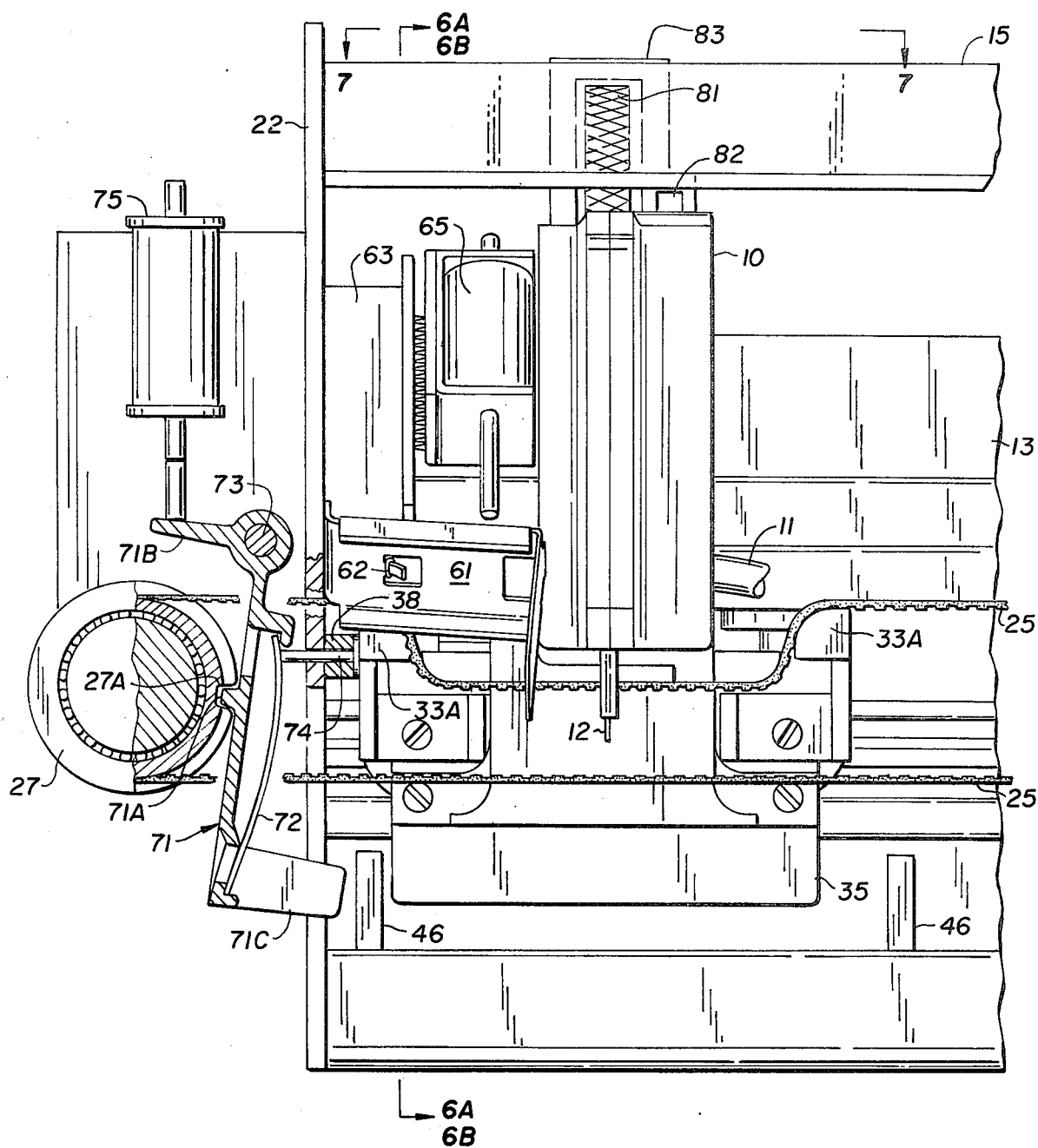
FIG._5.

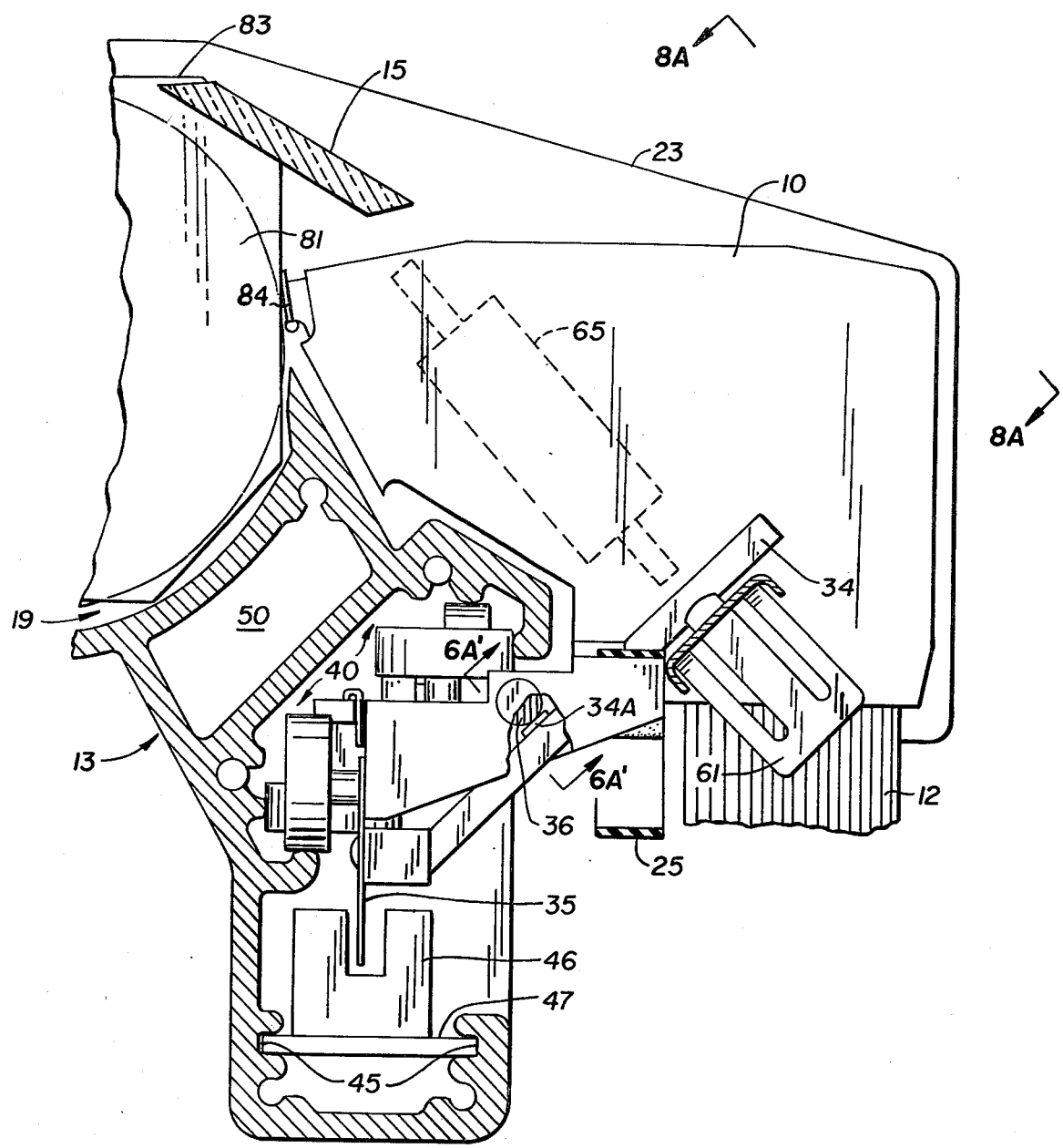
FIG.__6A.
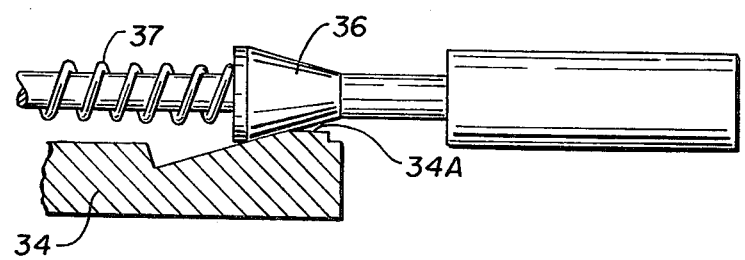
FIG.__6A'.

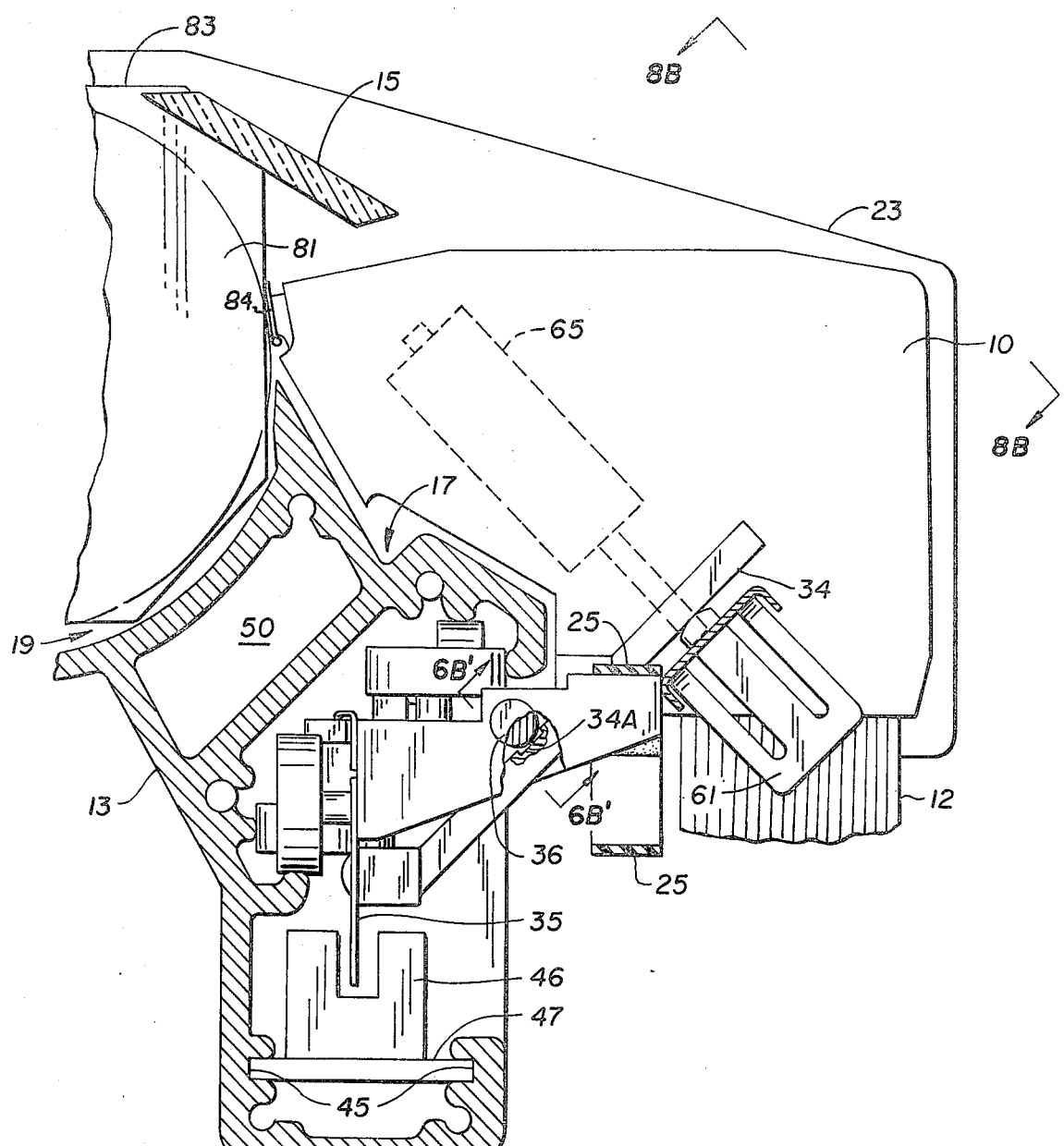
FIG._6B.
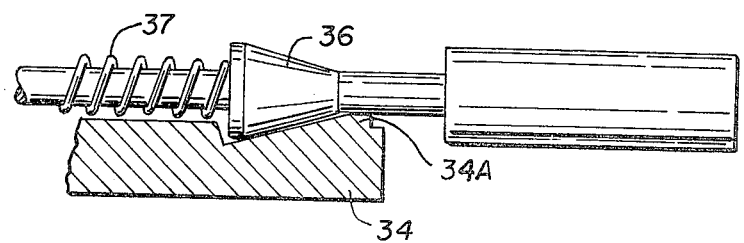
FIG._6B'.

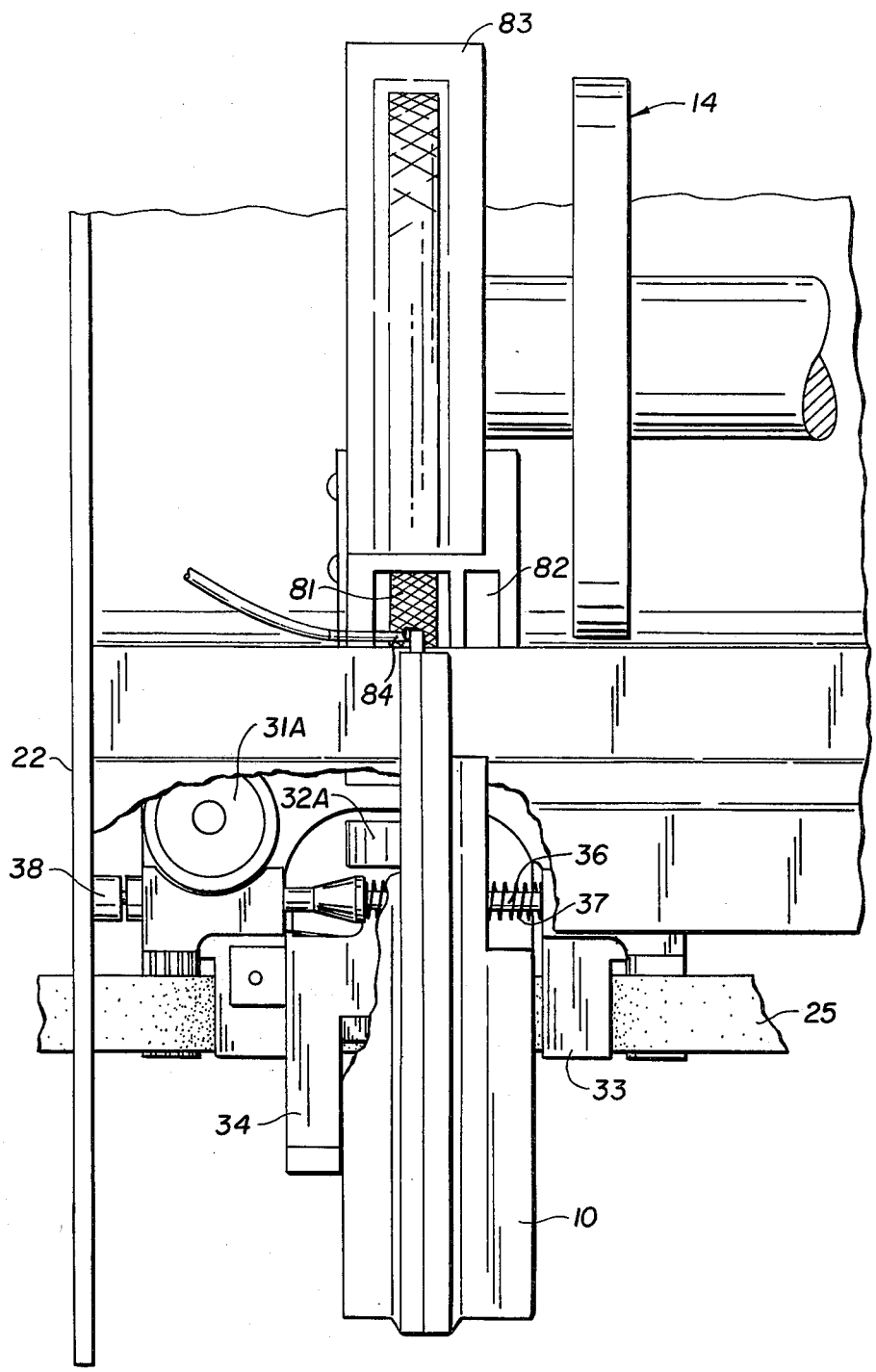
FIG._7.

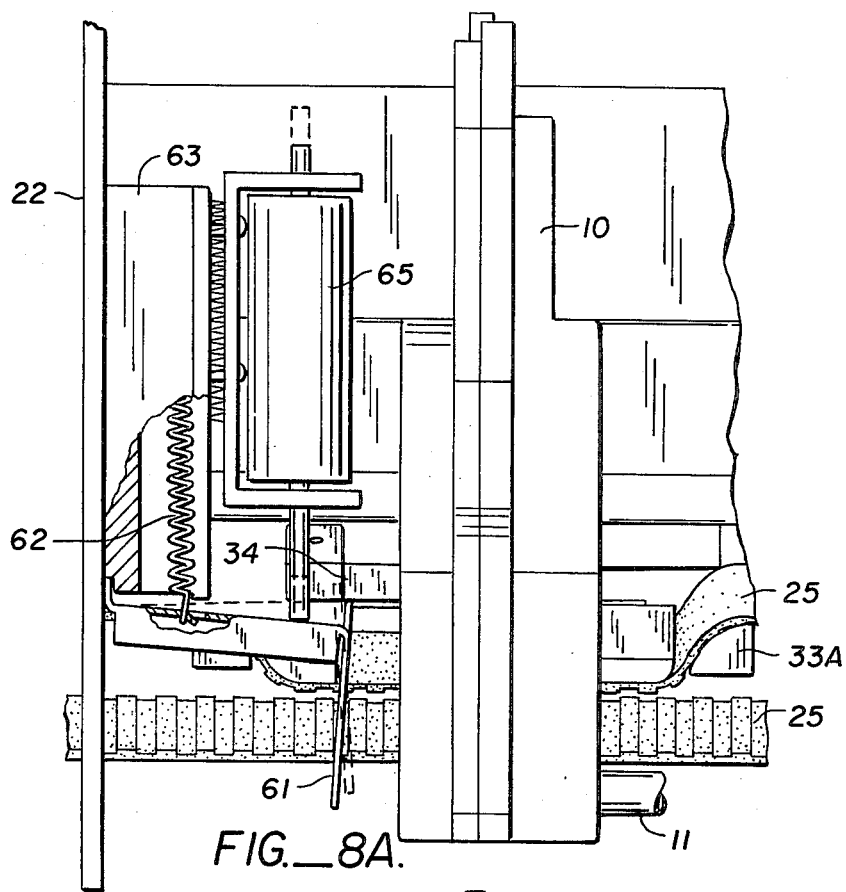
FIG._8A.
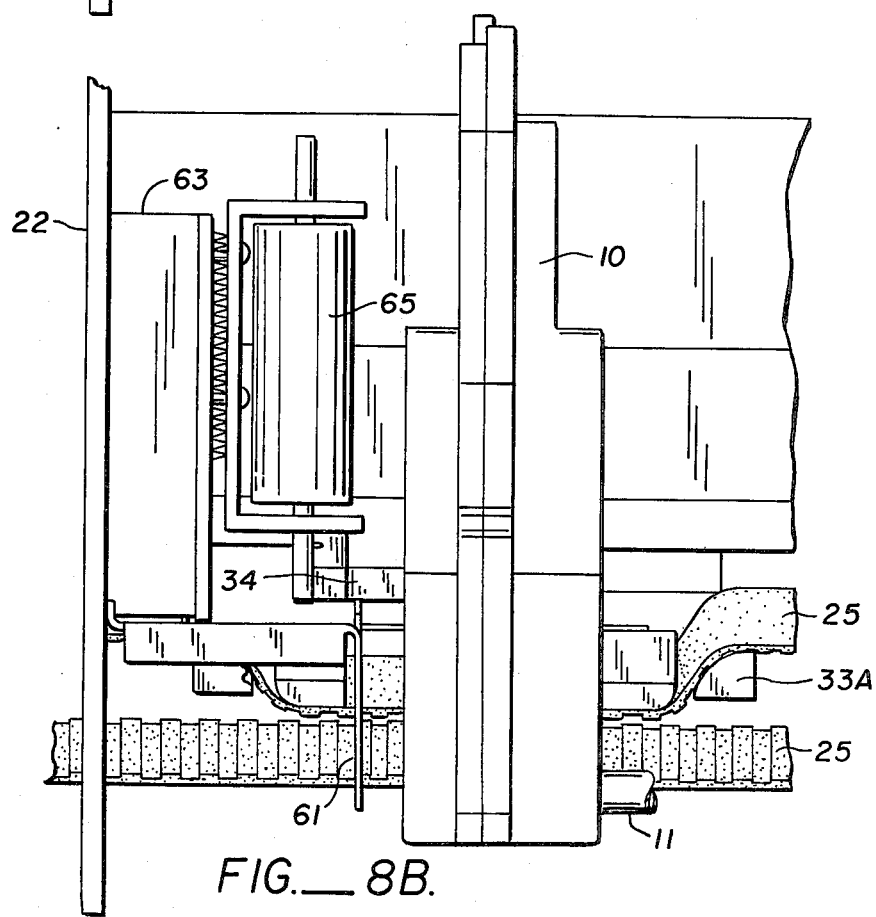
FIG._8B.

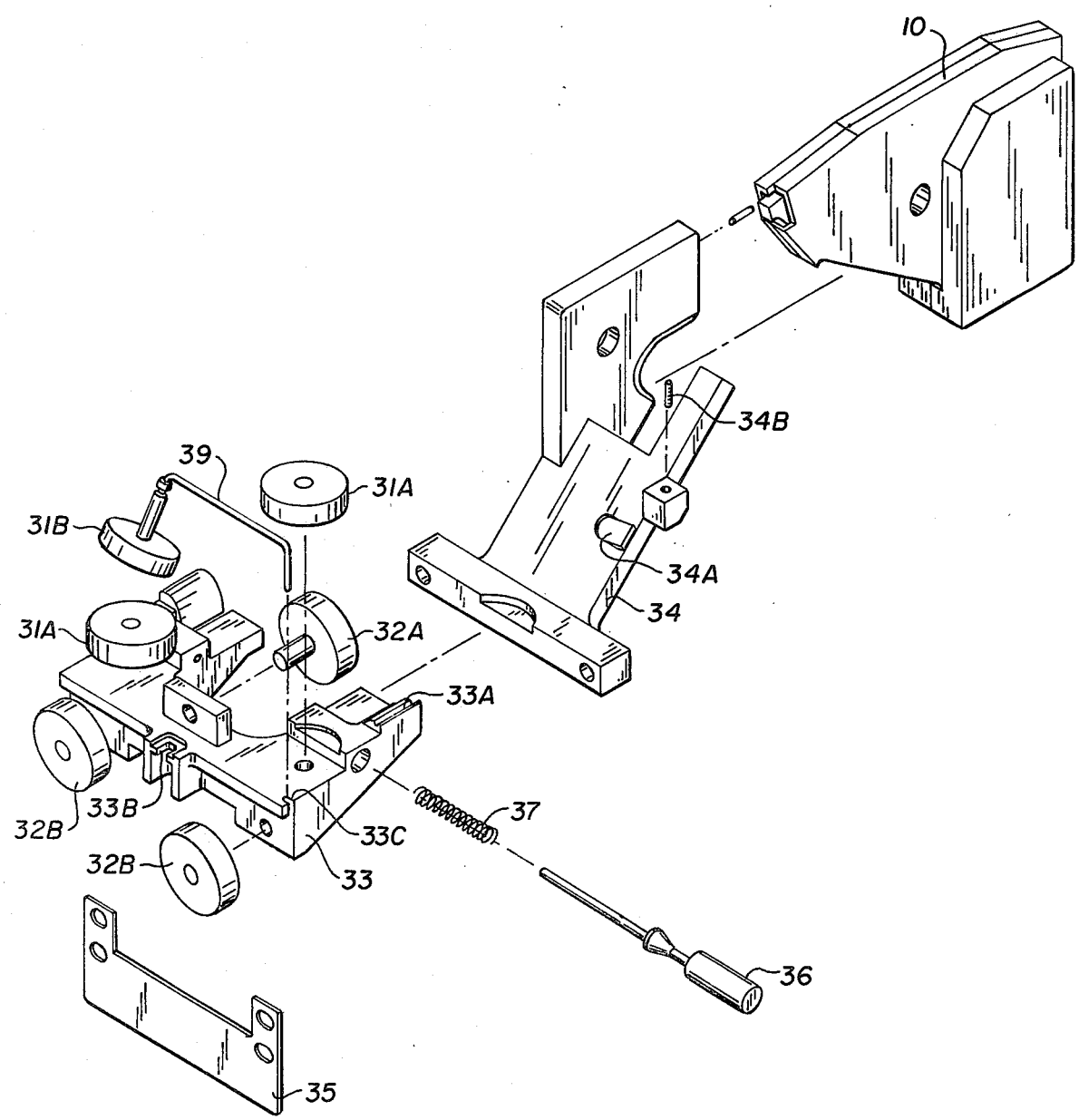
FIG._9.

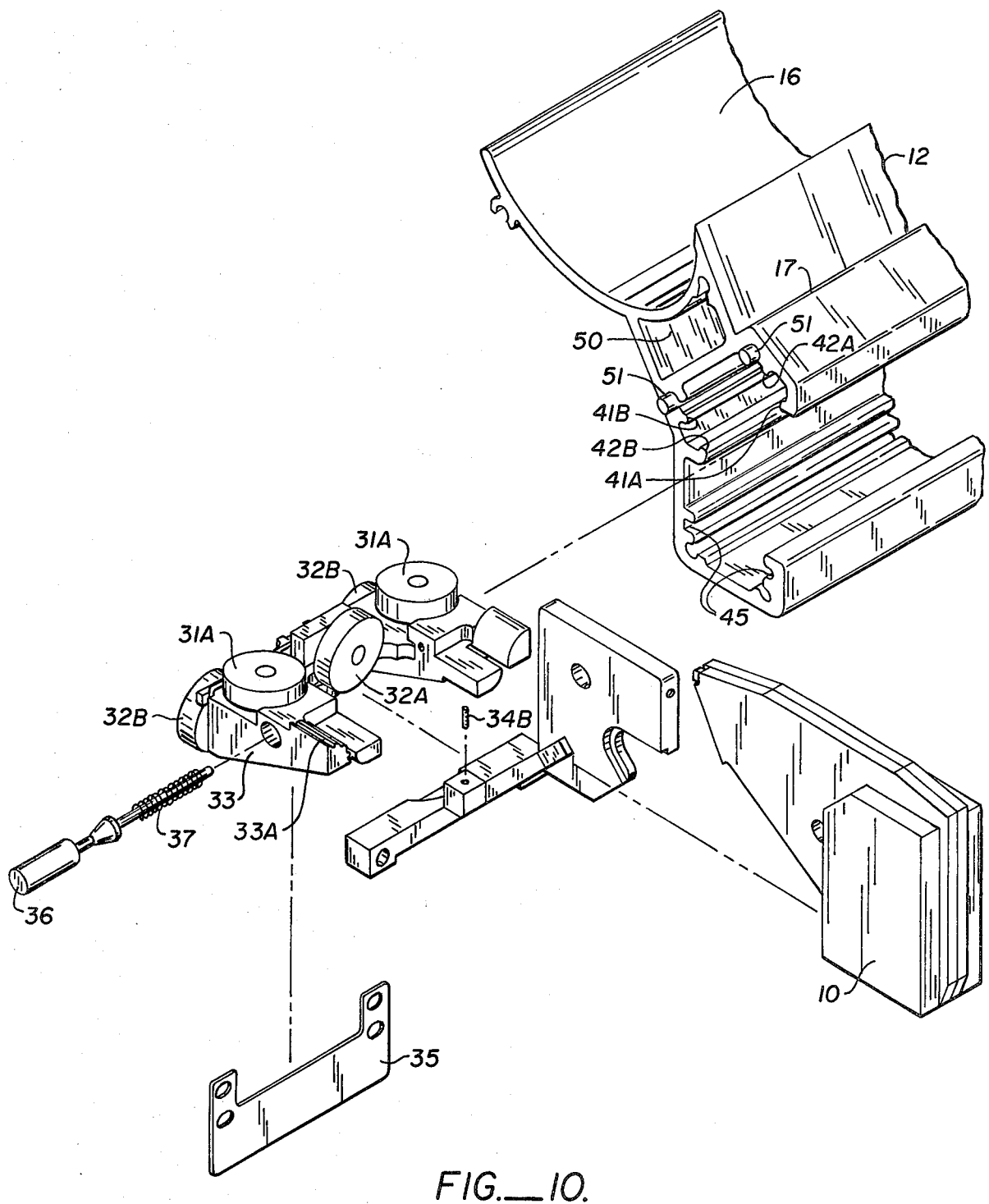
FIG._10.

CARRIAGE AND RACEWAY MECHANISM FOR AN INK JET PRINTER

BACKGROUND OF THE INVENTION

U.S. Pat. No. 2,946,398—Kyser et al (1976) and copending patent application Ser. No. 489,985, filed July 19, 1974, both assigned to the assignee of the present application, there is disclosed a method of asynchronous, volume displacement type of ink jet printing. By this method, a pressure chamber filled with ink is suddenly reduced in volume. From a nozzle connected to the pressure chamber, there is ejected a droplet of ink which then strikes a suitable recording medium. A vertical array of such pressure chamber and nozzles is preferably built to sweep across a recording medium line-by-line and upon reception of electrical signals to then discharge droplets in predetermined graphic patterns upon the recording medium.

To achieve this end, an array of pressure chambers and ink jet nozzles in the form of an ink jet print head is mounted on a carriage which moves along a raceway before a recording medium. The ink jet print head moves back and forth along the raceway and the recording medium is advanced for printing. One constraint on such a system is that the nozzles of the ink print head must be located very close to the surface of the recording medium due to the relative low speed of the ejected ink droplets. Moreover, as the ink jet print head passes across the medium, little variation in the distance between the surface of the medium and the nozzles of the ink jet print head is tolerable for acceptable print images.

Another consideration is that in any form of ink jet printing, but particularly with asynchronous ink jet printing, operation of such a system is particularly sensitive to contamination by dust or air bubbles and the drying of ink in the nozzles. One way of avoiding or reducing these difficulties is to provide for the capping and purging of the ink jet nozzles. Capping of the nozzles during non-operation prevents the drying of ink in the nozzles to maintain the proper ink viscosity for droplet ejection. (See Stone, U.S. Pat. No. 3,346,869). Entrance of impurities, such as dust and air, into the nozzles which impede the ink jet operation is avoided also. Purging allows the ink jet print head to discharge any impurities from the passages of the ink jet print head.

Furthermore, allowing the print head to intermittently eject ink droplets if any of the nozzles of the print head remain unfired for a predetermined amount of time while the print head is in operation and uncapped, avoids drying of ink in the ink jet nozzles, without substantially interfering with the printing operation.

OBJECTS OF THE INVENTION

To satisfy the above constraints and difficulties, it is an object of the present invention to provide a carriage and raceway mechanism which is stable and accurate in its tracking, allowing the nozzles of an ink jet print head to pass over the surface of a recording medium in close proximity.

It is another objective of the present invention to provide such a mechanism with low power requirements to drive the carriage along the raceway.

It is a further objective of the invention to provide a main frame into which is combined many features for the reduction of mechanical complexity and lowered manufacturing costs.

It is a further objective of the present invention to provide means for securely locking the carriage against movement along the raceway.

It is a further objective of the present invention to provide means by which the ink jet print head can be securely capped.

It is still a further objective of the present invention to provide means for purging the ink jet print head.

SUMMARY OF THE INVENTION

The present invention provides for a mechanism having a main frame, side plates at either end of the main frame, a raceway as part of the main frame, a carriage assembly engaging the raceway and mounting an ink jet print head, means for locking the carriage assembly against motion, and means for capping and purging the ink jet print head. Geometrical considerations in the placement of roller bearings on the carriage assembly firmly locks the assembly within the raceway, yet permits low-friction movement along the raceway. The raceway is stiffened by a special section to prevent distortion and is constructed as part of the main frame to stably and accurately fix the tracking of the carriage assembly. To keep the weight of the carriage assembly low to permit high speeds for the mounted print head with lower power requirements, most of the carriage locking means and the print head capping and purging means are located on one of the side plates of the main frame, rather than on the carriage assembly. Both capping and purging functions are performed in one carriage assembly position where the assembly is locked.

The carriage assembly has six roller bearings with plastic tires which engage the four running surfaces of the raceway to allow the carriage assembly to be driven easily along the raceway by a belt-and-pulley arrangement. Three of the roller bearings run horizontally with two bearings on one side and one on the other. Similarly, the remaining three vertical roller bearings run with two on the bottom and one on the top. The horizontal roller bearings are arranged so that opposition between the two bearings and the single one is indirect. The vertical roller bearings are also in indirect opposition. The single bottom horizontal roller bearing is spring-mounted on the carriage assembly, while the others are solidly mounted on the carriage and are only allowed to rotate.

Accordingly, to engage the roller bearings of the carriage assembly, the raceway has four parallel running surfaces arranged into two horizontally opposing running surfaces and two vertically opposing running surfaces with each surface of a pair of opposing running surfaces displaced from the line of direct opposition of its opposing surface. Each running surface is slightly rounded in a cross-sectional view.

Thus, the carriage assembly is resiliently constrained to run between the four parallel running surfaces. As the surface of each running surface is slightly rounded in a cross-sectional view, the contact between each roller bearing and its corresponding surface tends to be a point. Since each set of opposing surfaces is not in direct opposition to each other, the action of the single spring-mounted roller bearing is sufficient to compensate for any slight deviation in the spatial relationships between the running surfaces.

The comparatively low velocities of the ink droplets ejected from the nozzles of an asynchronous ink jet printer require close distances, about 30 thousandths of an inch (0.030 inch) between the recording medium receiving the ink droplets and the droplet ejecting nozzles of the ink jet print head. Moreover, tolerable variations in the distance between the medium and nozzles as the mounted print head moves along the raceway for acceptable print quality are small. To overcome these difficulties, the present invention provides for the raceway as part of the main frame. The side plates, located by dowel pins in the main frame and attached to the main frame at either end, position the axis of the platen around which the recording medium is wrapped. This simplifies the adjustments for the ink jet nozzle-recording medium distance so that close distances with little variation along the raceway are possible.

The main frame also contains a stiffening portion to prevent the raceway from being distorted, a paper guide for the platen which is mounted above the main frame, and an ink trough to catch any errant ink that accidentally escapes from the print head, and slots which accept a printed circuit board used in mounting detectors which indicate the position of the carriage assembly along the raceway. Moreover, the main frame is designed such that the raceway is covered and protected against dust in the atmosphere and that created by the advancing recording medium on the platen. Reference holes for the dowel pins are provided in the main frame for accurately machining the raceway and for the proper placement of the side plates on the main frame. The result is a main frame combining many functions into a single piece of uniform cross-sections. Mechanical complexity is markedly reduced and savings in manufacturing costs and time are made.

For capping and locking, the carriage assembly has a carriage base upon which the roller bearings are mounted, and a carriage arm. The lower end of the carriage arm is pivotally attached to the bottom of the carriage base. The upper end of the carriage arm, bearing the ink jet print head, passes diagonally upward and away from the raceway. The action of a cam rod passing through the carriage base in front of the carriage arm normally locks the carriage arm against the base to prevent the pivoting. Thus, the ink jet print head which is mounted on the carriage arm has a steady and accurate base from which ink droplets may be ejected as the carriage assembly moves along the raceway.

At one end of the raceway there are provided a latch mechanism for locking the carriage assembly against movement, a cap for the nozzles of the ink jet print head, and a purge needle in front of the cap. The construction of the present invention is such that the cam rod is displaced, making the carriage arm pivotable, only after the assembly is in its latched position. Capping of the ink jet print head can occur only after the carriage is locked against motion. This prevents any lateral motion of the nozzles of the print head with respect to the cap while the two are in contact, an undesirable occurrence in ink jet printing. Once the print head is in the capped position, it is held there whether power is supplied to the printer mechanism or not, eliminating worries of inadvertent power shutdowns.

The purge needle for sucking away all of the ink discharged in purging is placed in front of the cap. This requires the carriage assembly to be in the locked position for purging. The needle's exact location is to the side of the gap between the cap and the front of the uncapped print head and against the side of the print head. When the ink is discharged from the print head for purging, the ink completely fills the gap to also contact the purge needle. The block of ink formed washes the front of the print head. Then the ink is sucked away by the purge needle connected to a purge pump by a hollow tube. Thus, all capping and purging functions occur in one carriage assembly position where the assembly is locked against motion.

All of these locking and capping, purging mechanisms are mounted on the main body of the mechanism, rather than on the carriage assembly. This lowers the weight of the carriage assembly with lower power requirements for the drive motor and the speed of the carriage assembly and the print head along the raceway can be maintained for high printing rates.

BRIEF DESCRIPTION OF THE DRAWINGS

The present invention can be better understood by viewing the following drawings:

FIG. 1A shows an overall front perspective of the present invention;

FIG. 1B is a front close-up of the present invention;

FIG. 2 is a front view of the carriage assembly mounted in the raceway in an unlocked position;

FIG. 3 is a sectional view of the carriage assembly and raceway in an unlocked position, along line 3—3 in FIG. 2;

FIG. 4 is a top view of the carriage assembly mounted in the raceway in an unlocked position as indicated by line 4—4 in FIG. 2;

FIG. 5 is a front view of the carriage assembly in a locked position;

FIG. 6A is a sectional view of the carriage assembly in the raceway in the locked but uncapped position along line 6—6 in FIG. 5;

FIG. 6A' is a detailed and sectional view along line 6A'6A' in FIG. 6A; however, the position of the cam rod with respect to the carriage arm is shown when the carriage assembly is free;

FIG. 6B is a sectional view of the carriage assembly in the raceway in the locked and uncapped position along line 6—6 in FIG. 5;

FIG. 6B' is a detailed and sectional view along line 6B'—6B' in FIG. 6B;

FIG. 7 shows a top view of the carriage in the raceway in a locked position as indicated by line 7—7 in FIG. 5;

FIG. 8A is a detailed drawing of the carriage arm with respect to the cap spring before capping;

FIG. 8B shows the position of the capping spring under the carriage arm for capping;

FIG. 9 is an exploded isometric view of the raceway and carriage assembly; and

FIG. 10 is another exploded isometric view of the raceway and carriage assembly.

DETAILED DESCRIPTION OF THE PREFERRED EMBODIMENTS

An overall view of the present invention can be seen in FIG. 1A. A carriage assembly 30 is driven along a raceway 40 by a belt 25 with a left side pulley 27 and a right pulley 26 in a main frame 13 between side plates 22 and 23. An ink jet print head 10 is mounted on the carriage assembly 30 which rides along the raceway 40. The ink jet print head 10 shown is actually a cover of the actual print head assembly with a vertical array of pressure chambers and associated nozzles and piezoelectric drive crystals. The protective cover nearly completely encloses the print head assembly; only the cover can be seen in the drawings with a little of the nozzle area of the print head assembly exposed. A flexible ink supply tube 11 provides the print head 10 with ink; a flexible cable 12 provides electrical communication with the print head 10.

In this view and that of FIG. 1B, neither the raceway 40 nor much of the carriage assembly 30 can be seen. The raceway 40 and the carriage assembly 30 are tucked before and under the area through which the print head 10 sweeps back and forth. In the printing operation, the print head 10 is driven across the main frame 13 by the belt 25 and the pulleys 26 and 27. FIG. 2 shows the manner in which the toothed belt 25 engages a toothed portion 33A of the carriage assembly 30. The print head ejects ink droplets upon a recording medium, such as paper, which is advanced by a platen 14, shown as a rod mounting a plurality of coaxial discs. The platen 14 is rotatably held by the side plates 22, 23 attached to either end of the main frame 13 and driven by a belt 18 and a pulley 16 connected to a stepper motor (not shown). The recording medium (not shown) moves upward before the print head 10 to pass between a tear-off bar 15, made of clear plastic, and the platen 14. The nozzles of the print head 10 move back and forth in this interval between the edge of the main frame 13 and the beginning of the tear-off bar 15.

Referring to FIGS. 2, 3 and 4, which show the carriage assembly 30 in a free position for printing, a better view of the carriage assembly and the raceway 40 can be seen. FIGS. 9 and 10 also show different exploded, isometric views of the carriage assembly 30 and the raceway 40. The carriage assembly 30 has a carriage base 33 upon which four sets of roller bearings are mounted to indirectly oppose each other in the vertical and horizontal directions. A set of roller bearings 32A has only one roller bearing aligned vertically to run on an upper surface. Set 32B has two roller bearings running vertically on a lower surface. These two sets oppose each other by running on an upper and lower surface respectively, but the opposition is not direct since the set of roller bearings 32A is not in the line of direct opposition of the 32B. This relationship can be seen by examining the cross-sectional view of FIG. 3. Similarly, the remaining pair of roller bearing sets 31A and 31B indirectly oppose each other in the horizontal direction. The carriage 33 has a total of six roller bearings. The two roller bearings 31A on the horizontal surface 41A prevent skewing of the carriage base 33 in the horizontal plane. Likewise, the roller bearings 32B on the vertical surface 42B prevent skewing in the vertical plane. Additionally, the single roller bearing 31B is spring-loaded to resiliently press away from the base 33 by a bearing spring 39 held in place by an axle slot 33B and a spring slot 33C in the carriage base 33.

All of the six roller bearings 31A, 31B, 32A and 32B, are covered by tires made of 30% fiberglass-filled acetal plastic. This combines quietness in the motion of the roller bearings along the raceway 40 and durability against tire wear.

The raceway 40, enclosing the roller bearings on the carriage base 33, has four parallel running surfaces, engaging each set of roller bearings. The four parallel running surfaces form two horizontally opposing running surfaces 41A and 41B, engaging roller bearing sets 31A and 31B, respectively, and two vertically opposing running surfaces 42A and 42B engaging roller bearing sets 32A and 32B. Each surface of a pair of an opposing surface is displaced from the line of direct opposition of its opposing surface. Additionally, each running surface is slightly rounded in a cross-sectional view.

This arrangement of the roller bearing sets and the raceway 40 permits full engagement of all the roller bearings even with slight distortions in the raceway. For example, if the upper vertical running surface 42A has a small depression, the bearing spring 39 pushes the bearing 31B away from the carriage base 33 to displace the base 33 with respect to the surface 41B since the bearing 31B is not directly opposed by bearings 31A. The base 33 rotates slightly with both upper and lower vertical roller bearings 32A, 32B remaining in contact with their respective running surfaces. Since the contour of the running surfaces are slightly rounded for essentially point contact with the roller bearings, the angle with which each of the roller bearings rides on its respective surface as seen in a cross-sectional view can easily change as the carriage base 33 is displaced and rotated. (The same result may be obtained with cross-sectionally rounded roller bearings, i.e., crowned roller bearings, with flat running surfaces).

Thus, due to the displacement from direct opposition of each pair of horizontal and vertical running surfaces 41A, 41B and 42A, 42B, and the point contact between the roller bearings and their respective surfaces, full engagement of the carriage assembly 30 with the raceway 40 is assured with the spring-mounting of only a set of roller bearings on a single running surface. For further simplification, in the present embodiment the running surface 41B is chosen so that only the single roller bearing 31B is spring-mounted on the carriage base 33.

The raceway 40 is incorporated into the main frame 13 of the present invention rather than building the raceway 40 in parts which are then fixed to the main frame of a printer mechanism. The side plates 22 and 23 are located on the main frame 40 by dowel pins 51 in the main frame. The side plates, 22 and 23 position and rotatably fix the platen 14 which, in turn, positions the recording medium. Construction and the setting of the ink jet nozzle-recording medium distance are thus simplified. Slight adjustments in the distance are made at the mounting point of the print head 10 upon the carriage assembly 30.

Besides being the basic part from the ink jet printer mechanism which is assembled, the main frame 13 also contains a stiffening structure 50 to avoid any unnecessary distortion of the raceway 40, a paper guide 19 which allows the recording medium to pass around the platen 14 in a proper fashion, and an ink leakage trough 17 which catches any ink which may be leaking from the nozzles of the print head 10, and two slots 45 which accept a printed circuit board 47 which will mount optical switches 46. As can be seen by the side view of FIG. 3, the shape of the print head 10 is such that any ink dripping from the nozzles of the print head 10 will slide down the lower front of the print head 10 and away from the platen 14. The ink then encounters a downwardly protruding portion of the print head 10 where the ink accumulates and drops into the ink leakage trough 17. The optical switches 46 can be mounted at preferred locations on the board 47 to indicate certain locations of the carriage assembly 30 and the print head 10, such as the left and right margins for the printing operation. In the present invention a flat flexure 35, extending down from the carriage assembly 30, is used to interrupt the optical switches 46 which send electrical signals to the printer control mechanism. It should also be noted that the raceway 40 is located in a protected position under the ink leakage trough 17 and the paper guide 19. This prevents contamination of the running surfaces of the raceway 40 by dust in the air and dust generated by the advancement of the recording medium through the printer mechanism. The running surfaces are also protected from any ink which may leak from the print head 10. The cross-section of the main frame 13 is uniform and it can be constructed basically by an extrusion process. Reference dowels 51 are placed near the raceway so that further machining to true running surfaces 41 and 42 may be done. Also, as noted above, the dowel pins help position and mount the side plates 22 and 23. It can be readily seen that great manufacturing costs can be saved by the construction of the main frame as provided for in the present invention.

From the above discussion it is clear that the above carriage, raceway and construction of the main frame can easily be adapted for any printer mechanism, rather than simply ink jet printers, which require a print head mechanism running over a recording medium.

Looking more closely at the carriage assembly 30 in FIGS. 9 and 10, the structure of the assembly 30 which allows the pivoting of the ink jet print head 10 for capping is revealed. The carriage base 33 is attached near its bottom to the flat flexure 35 to which the lower end of a carriage arm 34 is also attached. The arm 34 passes diagonally upward through the base 33 and normally rests against the base 33 by a set screw 34B. With the flexing of the flexure 35, the upper end of the arm 34 upon which the print head 10 is mounted can pivot forward. However, a cam rod 36 held in place by a cam rod spring 37 normally immobilizes the carriage arm 34 from pivoting forward. FIG. 6A' shows the cam action of the cam rod 36 against a part 34A of the arm 34, while FIG. 6A shows the position of the print head 10 with respect to the platen 14.

Locking of the carriage assembly 30 occurs when it is driven to one end of the raceway 40 as seen in FIG. 2 and FIG. 5. The cam rod 36 then encounters a slider latch pin 74 mounted through a bumper 38 fixed to the left sideplate 22. The slider latch pin 74 is fixed to the end of a latch spring 72 and is displaced toward a latch 71, upon encountering the cam rod 36. This displacement causes the latch 71 to rotate about a latch pivot 73 against a pivot spring (not shown) so that a latch protrusion 71A of the latch 71 is driven into a slot 27A in the pulley 27. The location of the slot 27A is determined such that it will rotate and be in position when the carriage assembly 30 is in its furthest left and locking position. Furthermore, the arrangement of the latch 71, spring 72 and latch pin 74 allow some play in the position of the slot 27A as the carriage assembly approaches the latching position. Upon entry of the latch protrusion 71A into the slot 27A, the pulley 27 is now immobilized and the carriage base 33 and its assembly 30 can no longer be driven laterally by the belt 25 which is wrapped around the pulley 27. Moreover, deflection of the latch 71 also displaces a latch flag 71C at the bottom of the latch 71. This allows one of the optical switches 46 to be clear of the normal interruption of the flag 71C, which in turn signals the electronic control mechanism of the ink jet printer that the carriage assembly 30 is now latched. FIG. 5 best shows these relationships with FIG. 7 illustrating a vertical view.

After the carriage assembly 30 is driven to the end of the raceway 40 and locked, the print head 10 may be capped or purged. FIG. 1B, a close-up of FIG. 1A, and FIG. 7 show the print head 10 before a cap 81, a thick disc of urethane plastic, mounted in a cap housing 83 located near the left plate 22. While the cap 81 is a disc, its circumference is so large compared to the vertical array of ink jet nozzles of the print head 10 that the cap 81 essentially presents a flat surface with no curvature to the front of the print head 10, forming a seal against air and impurities when the print head 10 is pressed against the cap 81, as shown in FIG. 6B. Any ink left on the cap 81 from the nozzles is cleaned and wiped off from the flat circumference of the cap 81 by a doctor's blade and a pad wet with glycerine (neither shown) in the cap housing 83. A cap motor 85 rotates the cap 81 with respect to the blade and the pad by a worm gear engaging the gear teeth of a cap shaft 86 to which the cap 81 is mounted.

For capping the print head 10, having displaced the slider latch pin 74 to lock the assembly 33, the cam rod 36 encounters the bumper 38 as the assembly 33 continues toward its locking position at the end of the raceway 40. The cam rod 36 is displaced against the spring 37 with respect to the arm 34 to give some space for the arm 34 to pivot forward. FIG. 6B' shows the relative displacement. Referring to the details in FIGS. 6A and 8A, the carriage arm 34 is now positioned against a vertical arm of a cap spring 61. The dotted line in FIG. 8A shows this. The cap spring 61 is hinge-mounted on the side plate 22 and held by a second spring 62 which is attached to the cap spring 61 at one end. The other end of the spring 62 is fixed to a solenoid base 63 through which the spring 62 runs, as shown in FIG. 8A. The action of the spring 62 holds the cap spring 61 in place against the bottom of the base 63, which also mounts a cap solenoid 65. Upon receipt of a capping signal, the cap solenoid 65 drives its plunger down against the cap spring 61 and the action of the spring 62 to place the vertical arm of the cap spring 61 under the carriage arm 34. This can be seen in FIGS. 6B and 8B. The solenoid 65 then retracts its plunger and the cap spring 61 then pushes the carriage arm 34 forward. This places the nozzles of the print head 10 against the cap 81.

To release the ink jet print head 10 from capping, a signal is sent to the cap solenoid 65 which depresses the cap spring 61 so that the print head 10 returns to its normal position. While the cap spring 61 is depressed, another signal is sent to a latch solenoid 75 which drives its plunger against a latch arm 71B of the latch 71. This drives the latch protrusion 71A in the latch 71 out of the slot 27A in the pulley 27 and frees the pulley 27. The slider latch pin 74 then returns to its unlocked position and pushes the cam rod 36 and the carriage assembly 30 away from the bumper 38. This frees the cam rod 36 which by its spring 37 returns to its normal position immobilizing the carriage arm 34 into its normal print position. If the carriage assembly 30 is locked and the head is not capped, just the latch solenoid 75 is fired.

Thus, the present embodiment of the invention requires that the carriage assembly 30 be locked against any lateral motion before capping of the print head 10 can occur. This prevents any wiping of the ink jet nozzles by the cap 13 which may upset the delicate relationship of the ink in the ink jet nozzles. Impurities, such as dust and air bubbles, may enter the nozzles and severely interfere with the operation of ink jet printing. The electronic control mechanism is also set such that purging of the ink jet print head 10 by an L-shaped purge needle 84 can occur only when the carriage assembly 30 is locked. This ensures the correct positioning of the nozzles of the print head 10 with respect to the needle which is located in front of the cap 81 and which has a hole at its elbow which communicates through a hollow arm of the needle 84 to a purge pump (not shown). As the carriage assembly 30 is driven into the latched position at the end of the raceway 40, the print head 10 contacts the L-shaped purge needle 84 which is resiliently mounted to the cap housing 83. The print head 10 displaces the needle 84 slightly so that the print head 10 is approximately 18 thousandths of an inch (0.018 inch) in front of the cap 81 with the vertical leg of the L-shaped purge needle 84 immediately to and against the side of the front race of the print head 10. The purge needle 84 is located to the side to permit the print head 10 to move forward for capping as explained previously. For purging, the electronic control mechanism of the ink jet printer sends a signal to the print head 10 to allow a quantity of ink to flush through the print head 10. The ink under slight pressure from the ink supply begins to flow through the channels of the print head 10 and out from the print head nozzles. The discharge of ink removes impurities and air bubbles which interfere with the operation of the print head 10. The ink bridges the gap between the print head 10 and the cap 81 and also contacts the purge needle 84, forming a block of ink which cleans the front of the print head 10 of unwanted dust and other particles which may collect around the nozzles of the print head. The purge pump is engaged to keep the discharge ink from dripping off the head. After a predetermined amount of time, the supply of flushing ink is closed and the purge pump is speeded up to suck away all the discharged ink through the needle 84.

After purging of the print head 10 is completed, the carriage assembly 30 is released for the printing operation by firing the latch solenoid 75. As described earlier, the latch solenoid 75 frees the pulley 27 from the latch protrusion 71A so that the carriage assembly 30 and print head 10 can now be driven along the raceway 40.

An intermittent ejection pad 82 made from sponge is attached next to the cap 81 in the cap housing 83. The printer control mechanism is set such that ink droplets are intermittently ejected from those nozzles of the print head 10 into the pad 82 which have not ejected a droplet during a predetermined amount of time while the ink jet printer is in operation and uncapped. This allows fresher ink into the nozzles of the print head 10 to prevent ink drying in the nozzles. Since the quantity of ink ejected is so small, the ink is absorbed by the pad 82 and dries there.

Although the various aspects of the present invention have been described with respect to a preferred embodiment thereof, it will be understood that the invention is entitled to protection within the full scope of the appended claims.

I claim:

1. In a printer mechanism having a main frame, side plates at either end of said main frame, a platen rotatably mounted to said side plates, a carriage assembly, a print head mounted to said assembly, the main frame being a single piece of uniform cross-section along its length between said side plates, comprising:
   a raceway, engaging said carriage assembly whereby said assembly moves along said raceway,
   a stiffening section in close proximity with said raceway,
   a paper guide above said stiffening section,
   guide points near said raceway whereby said raceway may be machined and said side plates positioned,
   receptacle slots located below said raceway whereby a board bearing carriage assembly position indicators in placed.

2. A main frame as recited in claim 1, wherein said raceway further comprises:
   four parallel surfaces opposing each other in two perpendicular directions, each running surface being displaced from the line of direct opposition of its opposing running surface.

3. A main frame as recited in claim 2, wherein said running surfaces are slightly rounded in cross-section.

4. An ink jet printer mechanism having an ink jet print head, a main frame, side plates at either end of the said main frame, a platen rotatably mounted by said side plates, a carriage assembly bearing said print head along said main frame, wherein the improvement comprises:
   said main frame being a single piece of uniform cross-section along its length between said side plates having in a cross-sectional view:
      a raceway having four parallel running surfaces opposing each other in two perpendicular directions, each running surface being displaced from the line of direct opposition of its opposing running surface,
      a hollow stiffening section in close proximity with said raceway,
      a curved paper guide surface above said stiffening section,
      an ink collector trough to one side of said stiffening section,
      guide points near said raceway whereby said raceway may be machined and said side plates positioned,
      receptacle slots located below said raceway whereby a board mounting carriage assembly position indicators is placed,
   said carriage assembly having:
      four sets of roller bearings arranged in a manner to engage said four parallel running surfaces of said raceway, at least one set of roller bearings resiliently mounted to be biased against its running surface.

5. A latching and capping mechanism for an ink jet printer having a raceway, a carriage assembly engaging said raceway, an ink jet printer head mounted on said carriage assembly, comprising:
   means at one end of said raceway responsive to said carriage assembly position for latching said carriage assembly, whereby said carriage assembly can no longer move along said raceway,
   a substantially flat-surfaced cap located in front of said print head where said carriage assembly is latched,
   means in said carriage assembly for allowing said print head to pivot forward,
   means in said carriage assembly for immobilizing said pivoting means in a normal position, said immoblizing means being disengaged when said carriage assembly is in a latched position whereby said print head is free to pivot forward,
   means at the same end of said raceway for driving said print head forward onto said cap after said assembly is latched and said immobilizing means is disengaged, whereby the nozzles of said print head are capped.

6. A mechanism as recited in claim 5 further comprising:

means located in close proximity to and to one side of the gap between the cap and the front of said print head in the latched but uncapped position for sucking away ink discharged in purging said print head, whereby said print head may also be moved forward for capping.

7. In an ink jet printer having a main frame, side plates at either end of said main frame, a platen rotatably mounted to said side plates, a raceway mounted to said main frame, a carriage base engaging said raceway to move along said main frame, a carriage arm mounted on said carriage base, an ink jet print head mounted on said carriage arm, a cap mounted at one end of the main frame for capping said ink jet print head, the improvement comprising:

- a raceway having four parallel running surfaces opposing each other in the horizontal and vertical directions, each running surface being displaced from the line of direct opposition of its opposing running surface, and having a slightly rounded contour,
- said carriage base having six roller bearings, three roller bearings engaging one of said running surfaces and its opposing running surface in one direction, the remaining three engaging another of said running surfaces and its opposing running surface perpendicularly to the first direction, at least one of said bearings mounted in a manner to resiliently engage its running surface,
- a pivot between said carriage arm and said carriage base, whereby said carriage arm can be moved forward,
- a biased cam rod, extending through and slidably mounted in said carriage base, passing in front of said carriage arm, said cam rod in its normal position pressing against said carriage base, whereby said carriage arm is immmobilized from pivoting forward, and said cam rod freeing said carriage arm, to pivot forward when said cam rod is in a displaced position,
- a carriage latch mounted to one of said side plates, said latch being driven into a fitted slot in one of said pulleys when said carriage base is driven to the extreme position toward said side plate whereby said carriage base is immobilized from movement from along said raceway,
- a first drive means mounted on said side plate for pushing said carriage latch out of said fitted slot, whereby said carriage is disengaged to move along said raceway,
- a spring mounted to said side plate, said spring contacting said carriage arm when said carriage base is in said extreme position,
- a second drive means mounted on said plate for driving said spring below said carriage arm and then returning to its original position, whereby said spring engages said carriage arm to push said carriage arm and said print head forward into said cap.

8. A mechanism as recited in claim 7, further comprising:

- said cap mounted very close to the front of the print head in the latched but uncapped position whereby a block of ink will be formed in the gap between said cap and said print head upon the discharge of ink from the nozzles of said print head for purging,
- means located in close proximity to and to one side of said gap for sucking away said block of ink discharged for purging said print head, whereby said print head may also be moved forward for capping.

9. A mechanism as recited in claim 7, further comprising the main frame being a single piece of uniform cross-section along its length between said side plates having in a cross-sectional view:

said raceway,
a stiffening section in close proximity with said raceway,
a paper guide above said stiffening section,
an ink collector trough to one side of said stiffening section,
guide points near said raceway whereby said raceway may be machined and said side plates positioned,
receptacle slots located below said raceway, whereby a board bearing carriage assembly position indicators is placed.

* * * * *